United States Patent
El-Charif et al.

(10) Patent No.: US 10,284,643 B2
(45) Date of Patent: May 7, 2019

(54) SYSTEM AND METHOD FOR CLOUD DEPLOYMENT OPTIMIZATION

(71) Applicant: eBay Inc., San Jose, CA (US)

(72) Inventors: Rami El-Charif, San Jose, CA (US); Ankit Khera, San Jose, CA (US); Ashok Srinivasa Murthy, Fremont, CA (US)

(73) Assignee: eBay Inc., San Jose, CA (US)

( * ) Notice: Subject to any disclaimer, the term of this patent is extended or adjusted under 35 U.S.C. 154(b) by 339 days.

(21) Appl. No.: 14/864,657

(22) Filed: Sep. 24, 2015

(65) Prior Publication Data

US 2017/0093970 A1  Mar. 30, 2017

(51) Int. Cl.
| | |
|---|---|
| H04L 29/08 | (2006.01) |
| G06F 9/455 | (2018.01) |
| G06F 12/02 | (2006.01) |
| H04L 12/24 | (2006.01) |
| H04L 12/26 | (2006.01) |
| G06F 8/60 | (2018.01) |

(52) U.S. Cl.
CPC ............ *H04L 67/1095* (2013.01); *G06F 8/60* (2013.01); *G06F 9/45558* (2013.01); *G06F 12/0253* (2013.01); *H04L 41/0823* (2013.01); *H04L 41/0896* (2013.01); *H04L 41/12* (2013.01); *H04L 41/5054* (2013.01); *H04L 43/16* (2013.01); *G06F 2009/4557* (2013.01); *G06F 2212/1044* (2013.01); *H04L 41/084* (2013.01); *H04L 41/0886* (2013.01); *H04L 41/5096* (2013.01)

(58) Field of Classification Search
None
See application file for complete search history.

(56) References Cited

U.S. PATENT DOCUMENTS

| | | | |
|---|---|---|---|
| 8,954,574 B1 * | 2/2015 | Chheda | G06Q 20/085 709/220 |
| 2005/0193179 A1 * | 9/2005 | Cochran | G06F 11/2058 711/162 |
| 2010/0192220 A1 * | 7/2010 | Heizmann | G06F 11/3664 726/19 |
| 2011/0258621 A1 * | 10/2011 | Kern | G06F 9/5072 718/1 |

(Continued)

*Primary Examiner* — Thomas J Dailey
(74) *Attorney, Agent, or Firm* — Schwegman Lundberg & Woessner, P.A.

(57) ABSTRACT

Systems and methods of cloud deployment optimization are disclosed. In some example embodiments, a method comprises running original instances of an application concurrently on original servers to implement an online service, receiving, by the original instances of the application original requests for one or more functions of the online service, receiving a command to deploy a number of additional instances of the application, transmitting synthetic requests for the function(s) of the online service to one of the original servers according to a predetermined optimization criteria, deploying the number of additional instances of the application on additional servers using a copy of the original instance of the application, and running the deployed additional instances of the application on their corresponding additional servers concurrently with the original instances of the application being run on their corresponding original servers.

20 Claims, 13 Drawing Sheets

(56) References Cited

U.S. PATENT DOCUMENTS

| | | | |
|---|---|---|---|
| 2013/0031035 A1* | 1/2013 | Jeanne | H04L 41/142 706/12 |
| 2014/0026122 A1* | 1/2014 | Markande | G06F 11/3664 717/124 |
| 2015/0019713 A1* | 1/2015 | Bugenhagen | H04L 43/0811 709/224 |
| 2015/0309826 A1* | 10/2015 | Kirubanandam | G06F 9/45558 718/1 |

* cited by examiner

SYSTEM AND METHOD FOR CLOUD DEPLOYMENT OPTIMIZATION

TECHNICAL FIELD

Embodiments of the present disclosure relate generally to data processing and, more particularly, but not by way of limitation, to systems and methods of cloud deployment optimization.

BACKGROUND

In cloud-based computing, deploying applications and provisioning resources for those applications can take a lot of time, hindering the ability of an online service to react to an increase in demand. Additionally, the quality and operational efficiency of newly-deployed applications and their newly-provisioned resources may be unreliable.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

Figure 1:
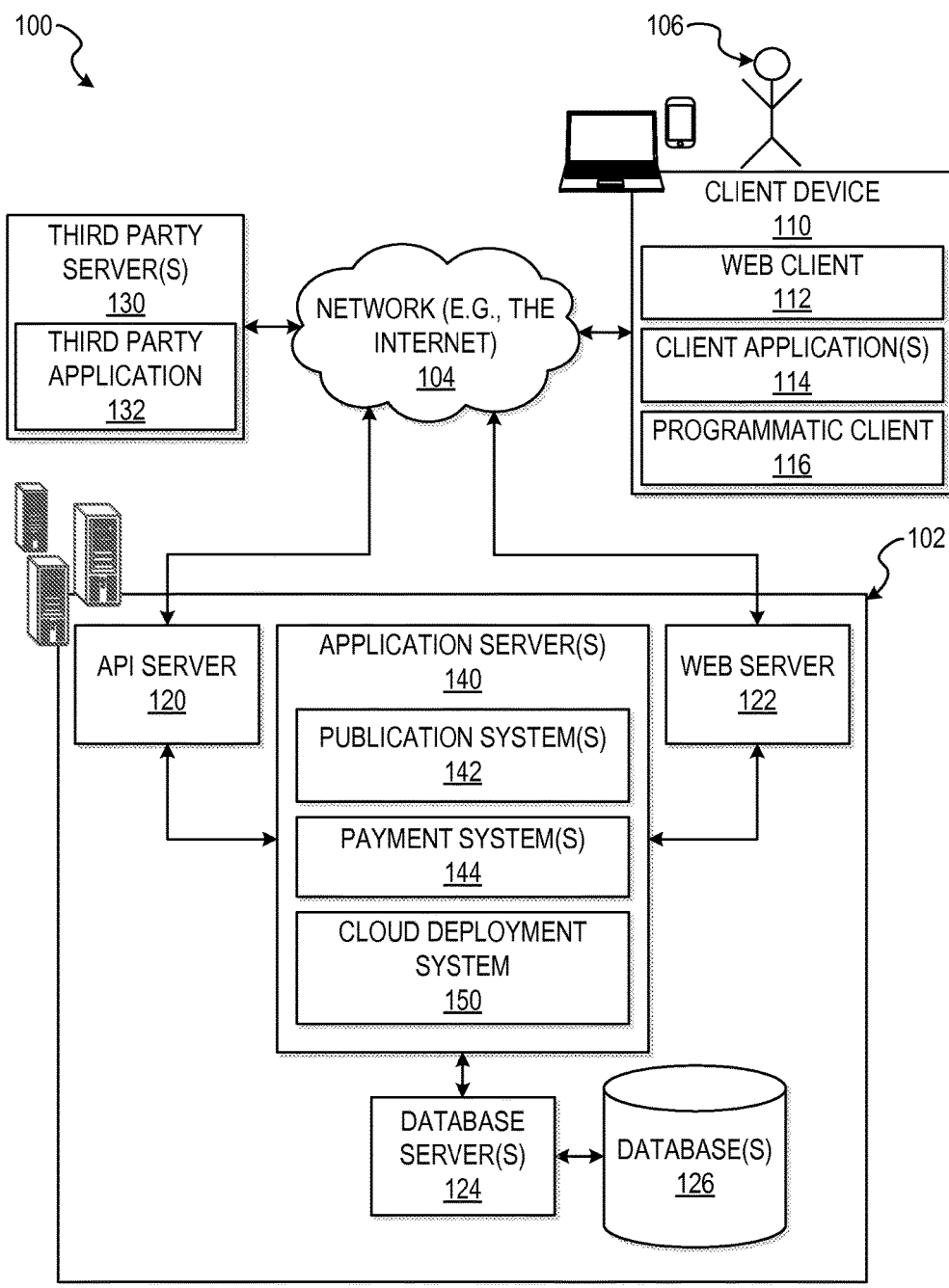
FIG. 1 is a block diagram illustrating a networked system, in accordance with some example embodiments.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter can be practiced without these specific details. In general, well-known instruction instances, protocols, structures, and techniques have not been shown in detail.

The present disclosure provides technical solutions for optimizing cloud deployment. These technical solutions provide fast and reliable deployment of an application on, and provisioning of, multiple additional servers, enabling the achievement of a small distribution time for distributing the application and a small downtime for the one or more original servers originally running the application.

Systems and methods of cloud deployment optimization are disclosed herein. In one example embodiment, a plurality of instances of an application are running a particular version of code on corresponding original machines (e.g., virtual machines), implementing an online service in a cloud environment, and a request is made to increase the capacity of the online service by increasing the instances of the application. For example, five-hundred instances of a first application can be running a first version of code, spread over five-hundred corresponding original machines, and a user-initiated or an automatic computer-initiated request can be made to increase the capacity by another five-hundred instances of the first application in order to achieve one-thousand instances of the first application running the first version of the code, spread over one-thousand corresponding machines (e.g., five-hundred original machines and five-hundred additional machines). A cloud deployment system can prepare (e.g., generate or copy) a base image, such as an image of an operating system (e.g., Ubuntu) on one of the plurality of original machines, for distribution to the additional machines. The cloud deployment system can then extend the base image, adding an image of the first application on top of the base image. The cloud deployment system can then distribute the base image and the application image to bare metal machines or hypervisors where the additional instances of the first application are to be spawned. This distribution can be performed using a daisy chain copying technique to optimize the distribution.

The cloud deployment system can select, either automatically or based on user input, one of the original machines already running the first application. Certain Java Virtual Machine and operating system optimization operations can be performed on the selected original machine, such as running a garbage collection operation, flushing the memory, and zeroing out certain memory bits for compacting the operating system memory. The optimizations can be performed to optimize the first application and minimize the memory footprint. The cloud deployment system then generates a memory snapshot of the selected original machine, compresses the memory snapshot, and copies, or otherwise distributes, the compressed memory snapshot along with a delta disk over to the bare metal machines or hypervisors to which the base image and the application image were distributed. This distribution can be performed using a daisy chain copying technique to optimize the distribution. The cloud deployment system can then transmit, to the a hypervisor of each additional machine to which the memory snapshot was distributed, a command to use the memory snapshot and spawn a new virtual machine. This command can be issued in parallel for all of the additional machines. For example, if five-hundred additional machines are requested, then the cloud deployment system can issue this command in parallel five-hundred times. The cloud deployment system can then perform post restoration actions, such as making the distributed operating systems and instances of the first application running on those operating systems aware of their new environment. The cloud deployment system can then enable traffic on the newly added machines, such that requests for functions of the online service can be received and processed by the newly added machines.

In some example embodiments, a method comprises: running each of a plurality of original instances of an application concurrently on a corresponding one of a plurality of original servers, with the corresponding original instances of the application on the plurality of original servers implementing an online service; receiving, by the corresponding original instances of the application on the plurality of original servers, original requests for one or more functions of the online service; receiving, subsequent to the corresponding original instances of the application receiving the original requests, a command to deploy a number of additional instances of the application; transmitting synthetic requests for the one or more functions of the online service to one of the plurality of original servers according to a predetermined optimization criteria; deploying, based on the command, each of the number of additional instances of the application on a corresponding additional server using a copy of the corresponding original instance of the application of the one of the plurality of original servers subsequent to the transmitting the synthetic requests; and running each of the deployed additional instances of the application on their corresponding additional servers concurrently with the original instances of the application being run on their corresponding original servers.

In some example embodiments, each of the plurality of original servers comprises a corresponding virtual machine, with each corresponding virtual machine having a corresponding operating system on which the corresponding original instance of the application on the corresponding original server runs, and the deploying further comprises: copying a first image of the corresponding operating system of the one of the plurality of original servers to each one of the additional servers; copying a second image of the corresponding instance of the application of the one of the plurality of original servers to each one of the additional servers; copying a memory snapshot of the corresponding virtual machine of the one of the plurality of original servers to each one of the additional servers; and copying a delta disk of the corresponding virtual machine of the one of the plurality of original servers to each one of the additional servers.

In some example embodiments, the copying of the first image, the copying of the second image, the copying of the memory snapshot, and the copying of the delta disk are performed using a daisy chain technique of repeatedly copying from one of the plurality of additional servers to another one of the additional servers until the first image, the second image, the memory snapshot, and the delta disk have been copied to all of the additional servers.

In some example embodiments, the predetermined optimization criteria comprises transmitting synthetic requests for the one or more functions of the online service to one of the plurality of original servers until a predetermined optimization criteria is satisfied, the predetermined optimization criteria comprises at least one of a predetermined number of synthetic requests has been transmitted, synthetic requests have been transmitted for a predetermined threshold period of time, and a predetermined performance metric threshold of the one of the plurality of servers has been satisfied.

In some example embodiments, the method further comprises performing at least one optimization operation on the one of the plurality of original servers, the at least one optimization operation comprising at least one of running a garbage collection operation, flushing a memory of the corresponding virtual machine of the one of the plurality of original servers, and zeroing out memory bits of the corresponding operating system of the one of the plurality of original servers.

In some example embodiments, the command to deploy the number of additional instances of the application is generated based on a corresponding request submitted by a user on a computing device.

In some example embodiments, the command to deploy the number of additional instances of the application is generated based on a detection of an overload condition, the overload condition comprising at least one of a traffic level of the online service satisfying one or more predetermined traffic level criteria, a network connection speed of the online service satisfying one or more predetermined network connection speed criteria, and a server speed of the online service satisfying one or more predetermined server speed criteria.

In some example embodiments, the running of each of the deployed additional instances of the application comprises receiving, by each of the deployed additional instances of the application, additional requests for the one or more functions of the online service.

In some example embodiments, the running each of the plurality of original instances of the application concurrently on the corresponding one of the plurality of original servers comprises running each of the plurality of original instances of the application concurrently on a corresponding Java Virtual Machine on the corresponding original server.

In some example embodiments, the online service comprises an online marketplace.

The methods or embodiments disclosed herein can be implemented as a computer system having one or more modules (e.g., hardware modules or software modules). Such modules can be executed by one or more processors of the computer system. The methods or embodiments disclosed herein can be embodied as instructions stored on a machine-readable medium that, when executed by one or more processors, cause the one or more processors to perform the instructions.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), an application 114, and a programmatic client 116 executing on client device 110.

The client device 110 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application servers 140 may host one or more publication systems 142, payment systems 144, and cloud deployment system 150, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The cloud deployment system 150 provides functionality operable to perform various cloud deployment operations, as will be discussed in further detail below. The cloud deployment system 150 may access the data from the databases 126, the third party servers 130, the publication system 142, and other sources. In some example embodiments, the cloud deployment system 150 may analyze the data to perform cloud deployment operations. In some example embodiments, the cloud deployment system 150 communicates with the publication systems 142 (e.g., accessing item listings) and payment system 144. In an alternative embodiment, the cloud deployment system 150 is be a part of the publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and cloud deployment system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Additionally, a third party application(s) 132, executing on a third party server(s) 130, is shown as having programmatic access to the networked system 102 via the programmatic interface provided by the API server 120. For example, the third party application 132, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
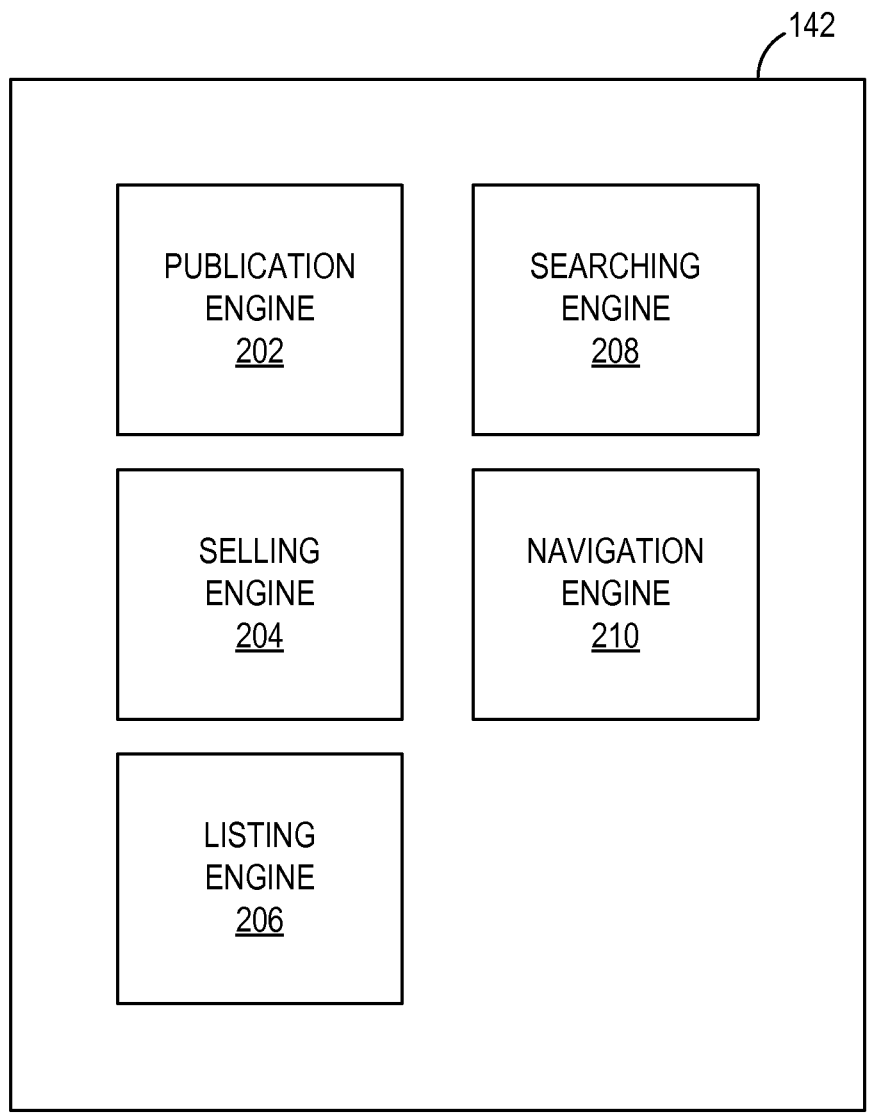
FIG. 2 is a block diagram illustrating various components of a network-based publication system, in accordance with some example embodiments.

FIG. 2 is a block diagram illustrating various components of the network-based publication system 142, in accordance with some example embodiments. The publication system 142 can be hosted on dedicated or shared server machines that are communicatively coupled to enable communications between server machines. The components themselves are communicatively coupled (e.g., via appropriate interfaces) to each other and to various data sources, so as to allow information to be passed between the components or so as to allow the components to share and access common data. Furthermore, the components can access one or more databases 126 via the database servers 124.

The publication system 142 can provide a number of publishing, listing, and/or price-setting mechanisms whereby a seller (also referred to as a first user) can list (or publish information concerning) goods or services for sale or barter, a buyer (also referred to as a second user) can express interest in or indicate a desire to purchase or barter such goods or services, and a transaction (such as a trade) can be completed pertaining to the goods or services. To this end, the publication system 142 can comprise at least one publication engine 202 and one or more selling engines 204. The publication engine 202 can publish information, such as item listings or product description pages, on the publication system 142. In some embodiments, the selling engines 204 can comprise one or more fixed-price engines that support fixed-price listing and price setting mechanisms and one or more auction engines that support auction-format listing and price setting mechanisms (e.g., English, Dutch, Chinese, Double, Reverse auctions, etc.). The various auction engines can also provide a number of features in support of these auction-format listings, such as a reserve price feature whereby a seller can specify a reserve price in connection with a listing and a proxy-bidding feature whereby a bidder can invoke automated proxy bidding. The selling engines 204 can further comprise one or more deal engines that support merchant-generated offers for products and services.

A listing engine 206 allows sellers to conveniently author listings of items or authors to author publications. In one embodiment, the listings pertain to goods or services that a user (e.g., a seller) wishes to transact via the publication system 142. In some embodiments, the listings can be an offer, deal, coupon, or discount for the good or service. Each good or service is associated with a particular category. The listing engine 206 can receive listing data such as title, description, and aspect name/value pairs. Furthermore, each listing for a good or service can be assigned an item identifier. In other embodiments, a user can create a listing that is an advertisement or other form of information publication. The listing information can then be stored to one or more storage devices coupled to the publication system 142 (e.g., databases 126). Listings also can comprise product description pages that display a product and information (e.g., product title, specifications, and reviews) associated with the product. In some embodiments, the product description page can include an aggregation of item listings that correspond to the product described on the product description page.

The listing engine 206 can also allow buyers to conveniently author listings or requests for items desired to be purchased. In some embodiments, the listings can pertain to goods or services that a user (e.g., a buyer) wishes to transact via the publication system 142. Each good or service is associated with a particular category. The listing engine 206 can receive as much or as little listing data, such as title, description, and aspect name/value pairs, that the buyer is aware of about the requested item. In some embodiments, the listing engine 206 can parse the buyer's submitted item information and can complete incomplete portions of the listing. For example, if the buyer provides a brief description of a requested item, the listing engine 206 can parse the description, extract key terms, and use those terms to make a determination of the identity of the item. Using the determined item identity, the listing engine 206 can retrieve additional item details for inclusion in the buyer item request. In some embodiments, the listing engine 206 can assign an item identifier to each listing for a good or service.

In some embodiments, the listing engine 206 allows sellers to generate offers for discounts on products or services. The listing engine 206 can receive listing data, such as the product or service being offered, a price and/or discount for the product or service, a time period for which the offer is valid, and so forth. In some embodiments, the listing engine 206 permits sellers to generate offers from the sellers' mobile devices. The generated offers can be uploaded to the publication system 142 for storage and tracking.

Searching the publication system 142 is facilitated by a searching engine 208. For example, the searching engine 208 enables keyword queries of listings published via the publication system 142. In example embodiments, the searching engine 208 receives the keyword queries from a device of a user and conducts a review of the storage device storing the listing information. The review will enable compilation of a result set of listings that can be sorted and returned to the client device 110 of the user. The searching engine 208 can record the query (e.g., keywords) and any subsequent user actions and behaviors (e.g., navigations).

The searching engine 208 also can perform a search based on the location of the user. A user can access the searching engine 208 via a mobile device and generate a search query. Using the search query and the user's location, the searching engine 208 can return relevant search results for products, services, offers, auctions, and so forth to the user. The searching engine 208 can identify relevant search results both in a list form and graphically on a map. Selection of a graphical indicator on the map can provide additional details regarding the selected search result. In some embodiments, the user can specify as part of the search query a radius or distance from the user's current location to limit search results.

The searching engine 208 also can perform a search based on an image. The image can be taken from a camera or imaging component of a client device or can be accessed from storage.

In a further example, a navigation engine 210 allows users to navigate through various categories, catalogs, or inventory data structures according to which listings can be classified within the publication system 142. For example, the navigation engine 210 allows a user to successively navigate down a category tree comprising a hierarchy of categories (e.g., the category tree structure) until a particular set of listings is reached. Various other navigation applications within the navigation engine 210 can be provided to supplement the searching and browsing applications. The navigation engine 210 can record the various user actions (e.g., clicks) performed by the user in order to navigate down the category tree.

Figure 3:
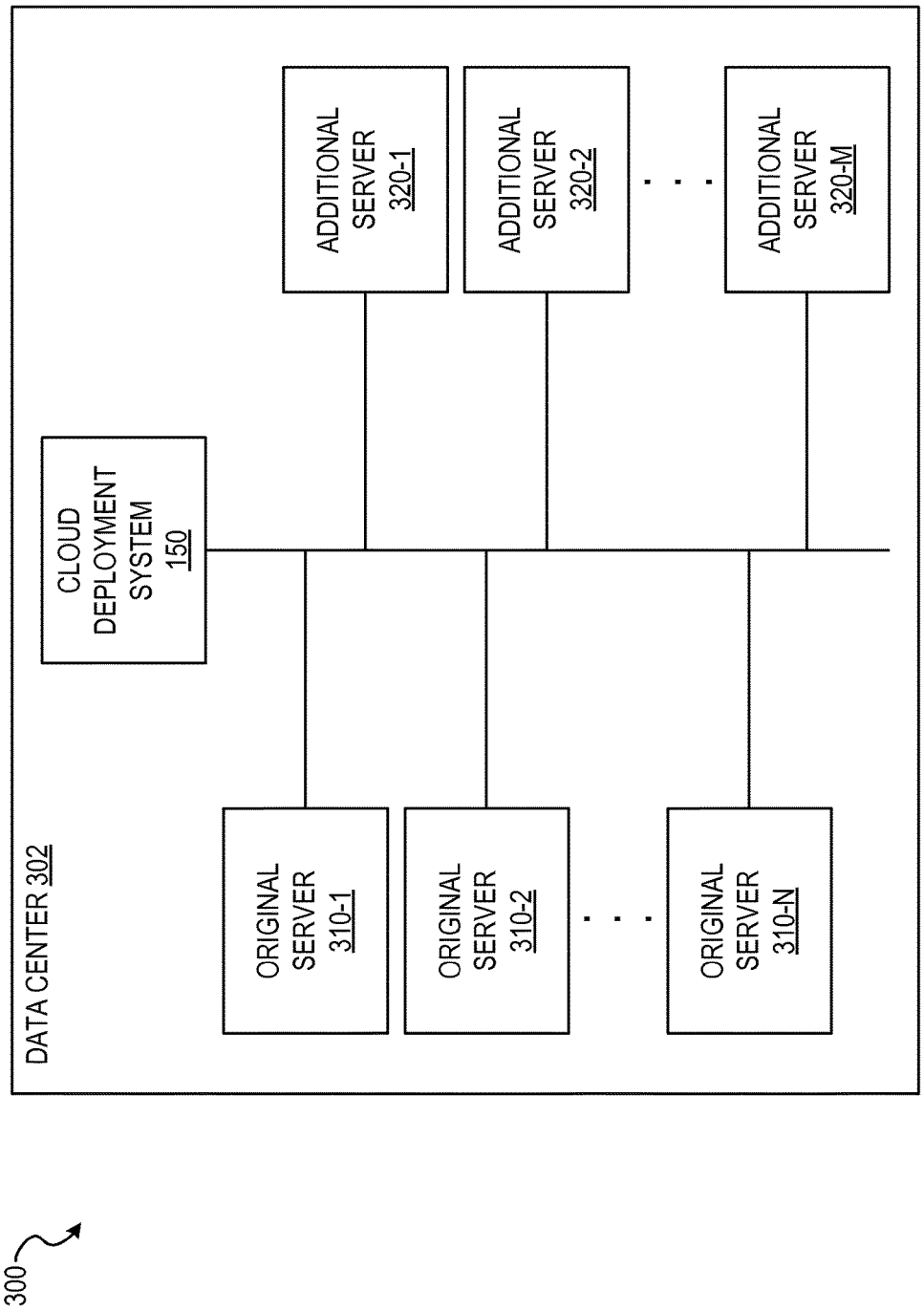
FIG. 3 a block diagram illustrating a cloud deployment system employed within a cloud computing environment, in accordance with some example embodiments.

FIG. 3 is a block diagram illustrating components of the cloud deployment system 150 within a cloud computing environment 300, in accordance with some example embodiments. The cloud computing environment 300 enables network access to a shared pool of configurable computing resources, providing users and enterprises with various capabilities to store and process their data in third-party data centers, such as data center 302. The cloud computing environment 300 enables online services to be delivered to computing devices (e.g., client device 110 in FIG. 1) via the Internet. Cloud resources, such as servers, can be shared by multiple users, and can also be dynamically reallocated per demand.

In some example embodiments, cloud deployment system 150 comprises a memory and at least one processor, which implements one or more modules to manage the resources of the cloud computing environment 300, such as servers on data center 302, performing the cloud deployment functions described herein. Although FIG. 3 shows cloud deployment system 150 residing within data center 302, it is contemplated that cloud deployment system 150, or a portion of its components, can be external to data center 302.

In some example embodiments, data center 302 comprises one or more original servers 310 (e.g., original servers 310-1, 310-2, ..., 310-N in FIG. 3). Each original server 310 can run a corresponding instance of an application concurrently with the other original servers 310, implementing an online service. For example, original servers 310-1 to 310-N can each concurrently run a corresponding instance of a software application for an online service. The cloud deployment system 150 can enable the original servers 310 to receive original requests for one or more functions of the online service implemented by the software application on the original servers 310. For example, the instances of the software application on the original servers 310 can receive search queries for items on an online marketplace. The instances of the software application on the original servers 310 can then process the requests, such as by performing a search and the corresponding search results, such as by generating and displaying a search results page for a user that submitted a search request. It is contemplated that other functions and other online services are also within the scope of the present disclosure.

In some example embodiments, each original server 310 comprises a corresponding virtual machine (e.g., a Java Virtual Machine), with each corresponding virtual machine having a corresponding operating system (e.g., Ubuntu) on which the corresponding original instance of the application on the corresponding original server 310 runs.

In some example embodiments, data center 302 also comprises one or more additional servers 320 (e.g., additional servers 320-1, 320-2, ..., 320-M in FIG. 3). While each original server 310 can run a corresponding instance of an application concurrently with the other original servers 310, implementing an online service, the additional servers 320 do not comprise an instance of the application. In some example embodiments, the additional servers 320 are bare metal machines.

In some example embodiments, while the original instances of the application are running and receiving the original requests, the cloud deployment system 150 receives a command to deploy a number of additional instances of the application. In some example embodiments, the command to deploy the number of additional instances of the application is generated based on a corresponding request submitted by a user on a computing device, such as client device 110 in FIG. 1. For example, a user can submit a request for additional resources for an online service, specifying a number of additional resources (e.g., an increase of five-hundred servers, machines, or instances of the application), via a user interface provided by the cloud deployment system 150.

In some example embodiments, the command to deploy the number of additional instances of the application is generated based on a detection of an overload condition. The overload condition can comprising at least one of a traffic level of the online service satisfying one or more predetermined traffic level criteria (e.g., more than a specified number of requests within a predetermined period of time), a network connection speed of the online service satisfying one or more predetermined network connection speed criteria (e.g., the network speed of the cloud computing environment 300 dropping below a predetermined level), and a server speed of the online service satisfying one or more predetermined server speed criteria (e.g., a speed of one or more of the original servers 310 dropping below a predetermined level). The cloud deployment system 150 can detect an overload condition, determine a number of additional resources to request based on the overload condition, automatically generate the command indicating the number of additional resources being requested, and execute the command, adding the number of additional resources as requested.

In some example embodiments, the cloud deployment system 150 manages an optimization of the resources to be copied to additional servers 320 so that the resources are fully optimized and ready to operate at peak performance once deployed onto the additional servers 320. One way of achieving such optimization is to optimize at least one instance of the application on an original server 310 by ensuring that it runs for a predetermined amount of time, or for a predetermined amount of traffic (e.g., received or processed a predetermined number of requests), or according to some other predetermined optimization criteria (e.g., a predetermined performance metric threshold of the original server 310, such as server speed, has been satisfied). In some example embodiments, the cloud deployment system 150 triggers the deployment of the additional instances of the application onto the number of additional servers 320 based on a determination that the predetermined optimization criteria has been satisfied, such as a determination that one of the original servers 310 has been running for a predetermined amount of time or has received or processed a predetermined amount of traffic. In this fashion, the cloud deployment system 150 ensures that one original instance of the application on one of the original servers 310 is optimized before copying that original instance and deploying the copies to the additional servers 320, delaying the copying until the optimization of the original instance has been achieved. The cloud deployment system 150 can use standard client traffic (e.g., requests from non-administrative users, such as customers) to optimize the original instance of the application. Additionally or alternatively, the cloud deployment system 150 can use synthetic traffic to optimize the original instance of the application. For example, instead of waiting for standard client traffic to optimize the original instance of the application, the cloud deployment system 150 can force the optimization by transmitting synthetic requests for one or more functions of the online service to one of the original servers 310 according to the predetermined optimization criteria. The term "synthetic" is used herein to refer to requests that are not received via natural client traffic when the application is live and accessible to non-administrative users, but rather via an internal administrative entity.

In some example embodiments, the cloud deployment system 150 performs one or more optimization operations on one of the original servers 310, with the one or more optimization operations comprising running a garbage collection operation, flushing a memory of the corresponding virtual machine of the one of the original servers 310, and zeroing out memory bits of the corresponding operating system of the one of the original servers 310. Other optimization operations are also within the scope of the present disclosure.

In some example embodiments, the cloud deployment system 150 is configured to, based on the command to deploy the number of additional instances of the application, deploy each of the number of additional instances of the application on a corresponding additional server 320 using a copy of the corresponding original instance of the application. As previously discussed, this deployment can also be based on a determination that the original instance has been sufficiently optimized.

In some example embodiments, deploying the number of additional instances of the application comprises copying a first image of the corresponding operating system of the original server 310 to each one of the additional servers 320, copying a second image of the corresponding instance of the application of the original server 310 to each one of the additional servers 320, copying a memory snapshot of the corresponding virtual machine of the original server 310 to each one of the additional servers 320, and copying a delta disk of the corresponding virtual machine of the original server 310 to each one of the additional servers 320.

In some example embodiments, the copying of the first image, the copying of the second image, the copying of the memory snapshot, and the copying of the delta disk are performed using a daisy chain technique of repeatedly copying from one of the plurality of additional servers 320 to another one of the additional servers 320 until the first image, the second image, the memory snapshot, and the delta disk have been copied to all of the additional servers. For example, an image can be copied from the original server 310 to a first additional server 320-1. The image on the first additional server 320-1 can then be copied to a second additional server 320-2, and so on and so forth until each of the number of additional servers 320 has received a copy of the image.

Once the additional instances of the application have been deployed to the additional servers 320, the cloud deployment system 150 runs each of the deployed additional instances of the application on their corresponding additional servers 320 concurrently with the original instances of the application being run on their corresponding original servers 310, thereby achieving the desired increase in capacity for the online service. In some example embodiments, the running of each of the deployed additional instances of the application on the additional servers 320 comprises receiving, by each of the deployed additional instances of the application, additional requests for one or more functions of the online service.

FIG. 4A-4H illustrate different stages of optimizing cloud deployment for data center 302, in accordance with some example embodiments. In FIGS. 4A-4H, data center 302 is shown as having original server 310-1 and additional servers 320-1 to 320-M. It is contemplated that more than one original server 310 can be employed, however only one original server 310-1 is show in FIGS. 4A-4H for convenience and simplicity.

Figure 4A:
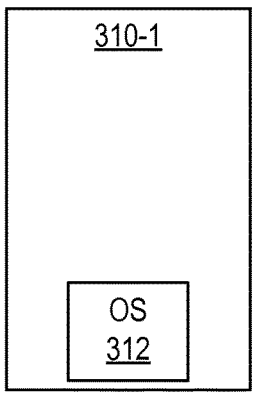
FIG. 4A-4H illustrate different stages of optimizing cloud deployment, in accordance with some example embodiments.
Figure 4A:
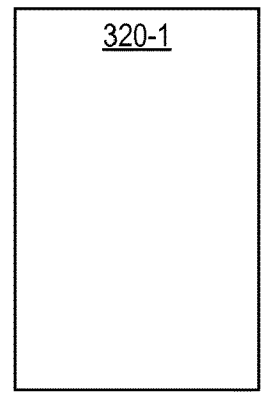
Figure 4A:
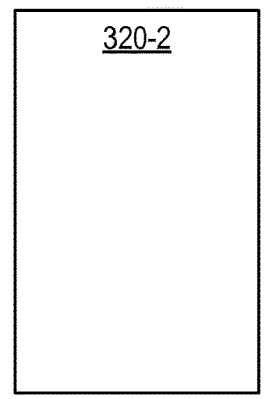
Figure 4A:
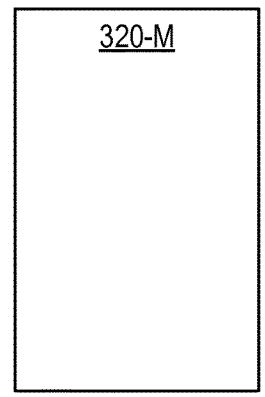
Figure 4B:
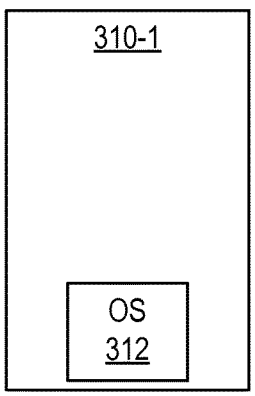
Figure 4B:
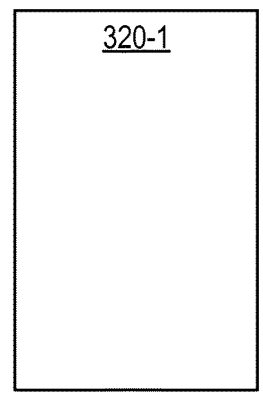
Figure 4B:
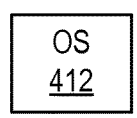
Figure 4B:
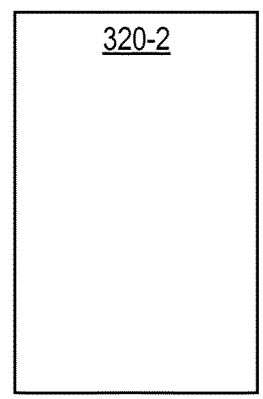
Figure 4B:
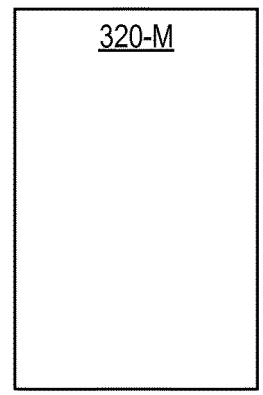
Figure 4C:
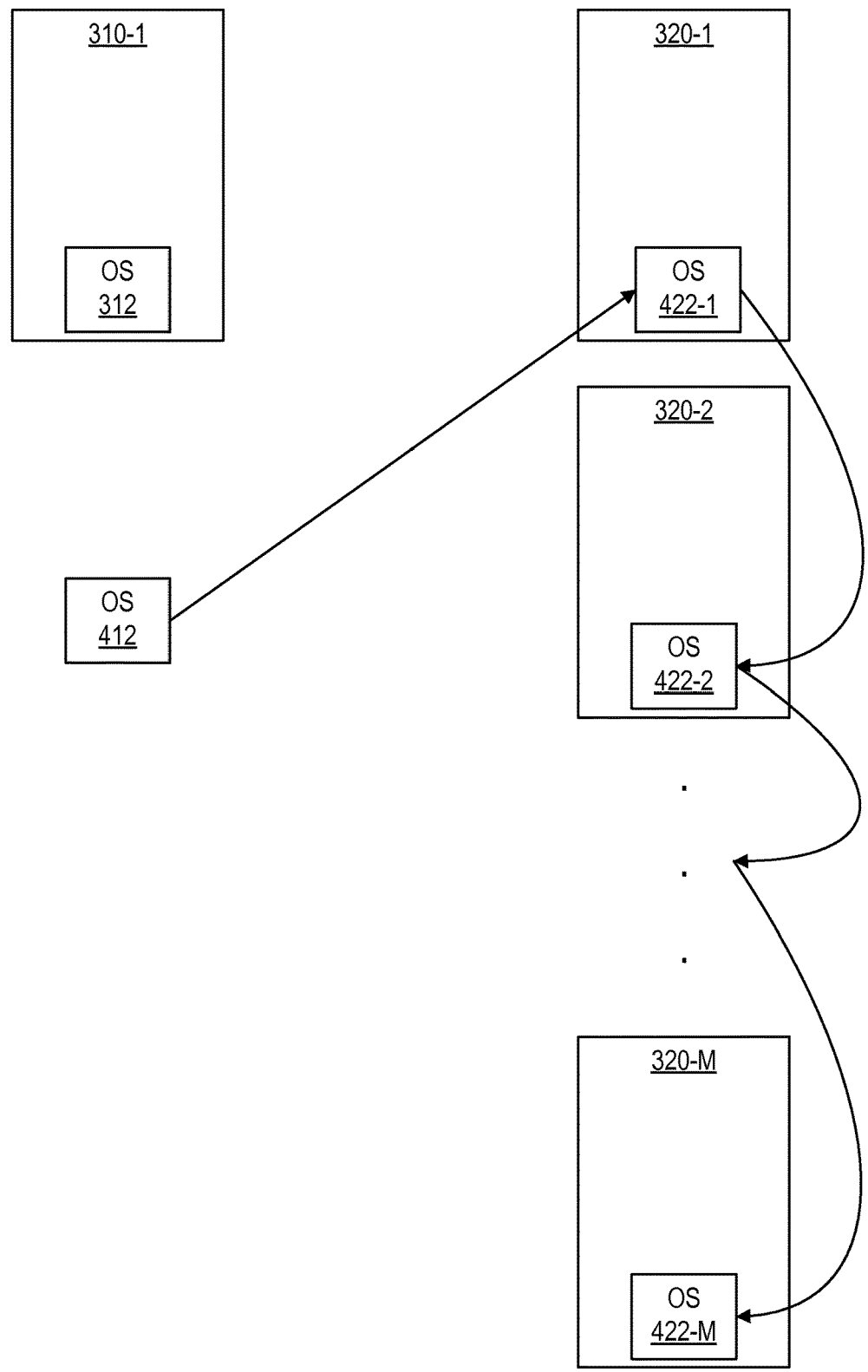
Figure 4D:
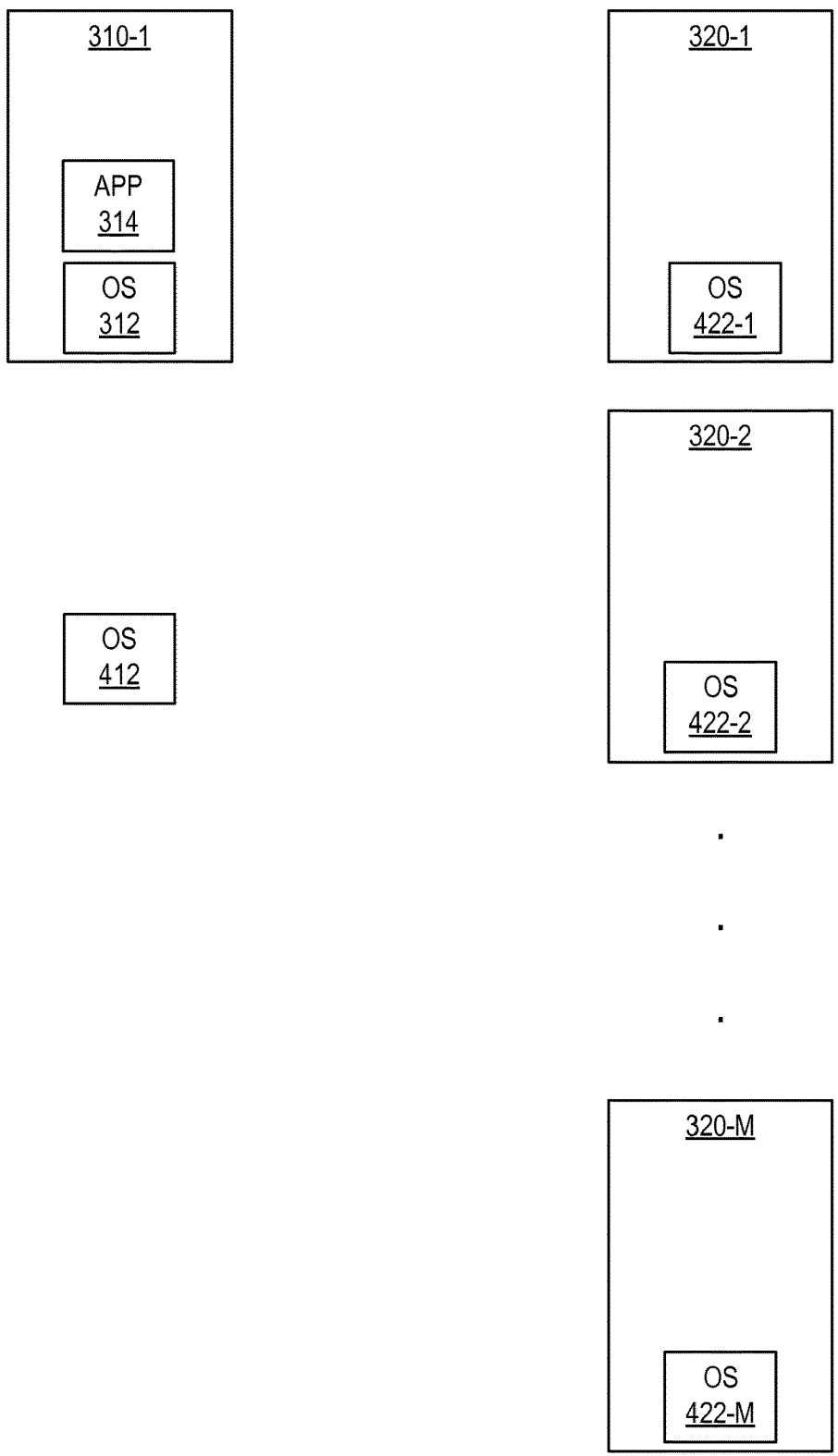
Figure 4E:
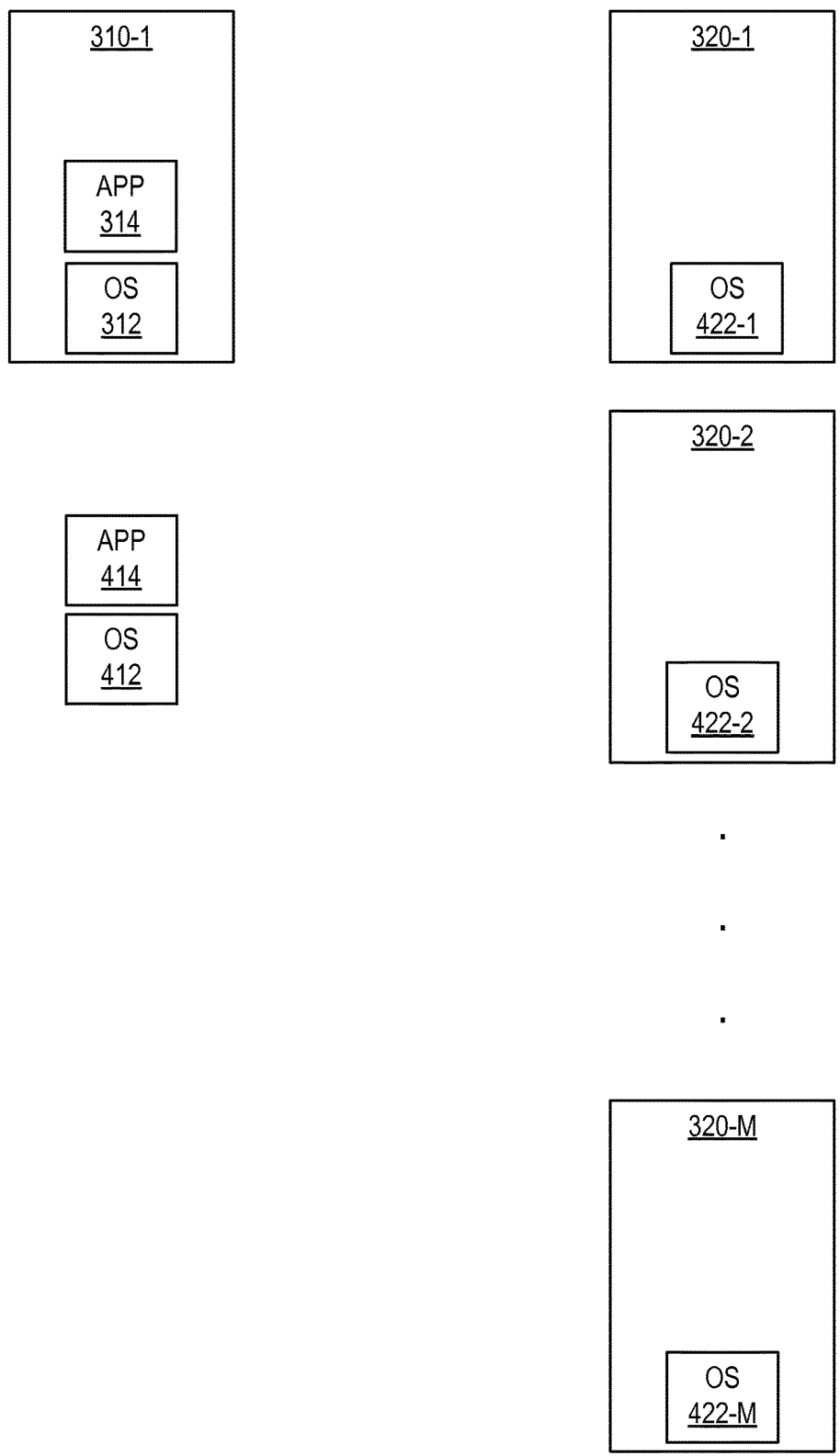
Figure 4F:
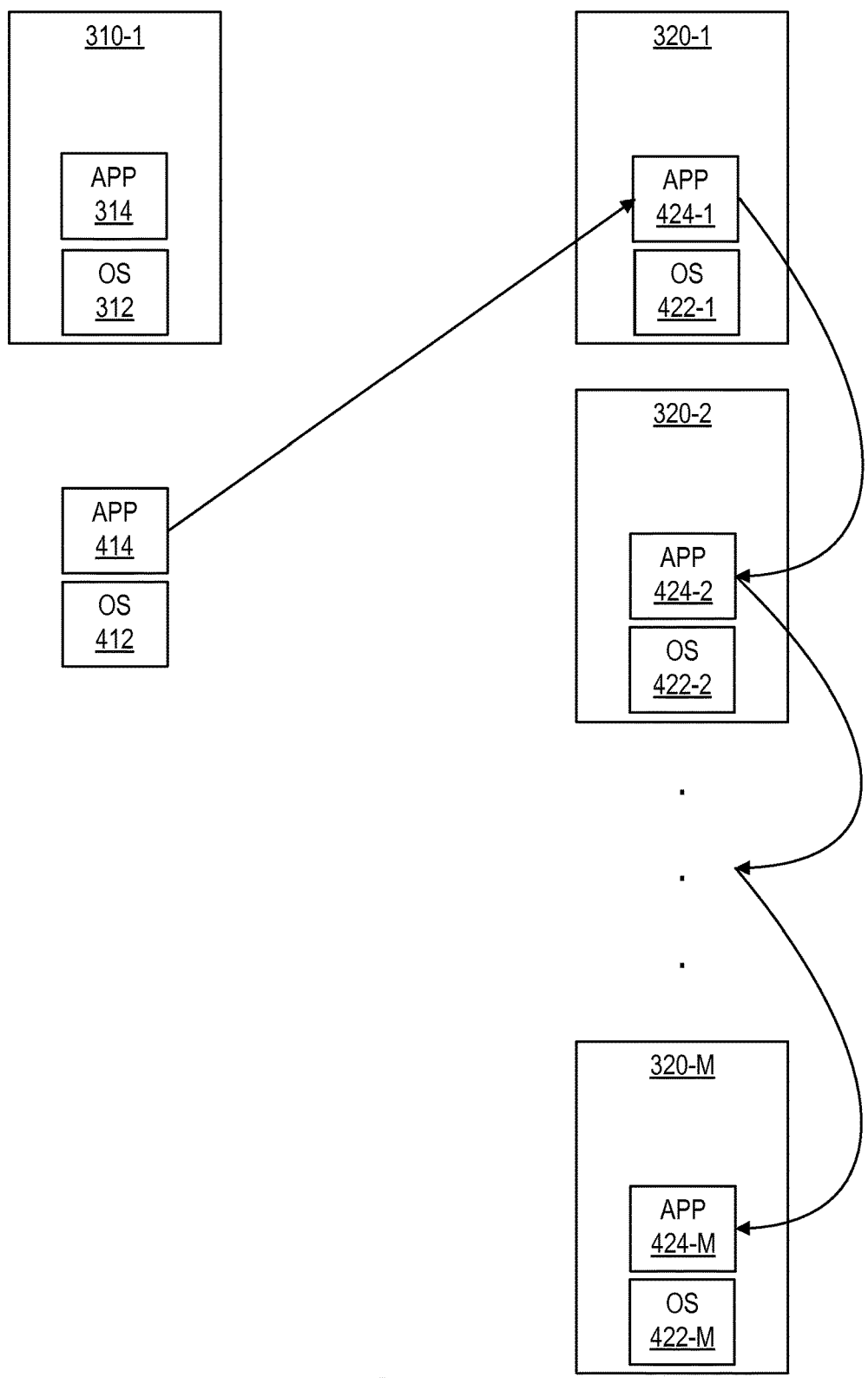

In some example embodiments, original server 310-1 and additional servers 320-1 to 320-M start off as bare metal machines. In FIG. 4A, the cloud deployment system 150 installs a virtual machine including an operating system 312 on the original server 310-1. In FIG. 4B, the cloud deployment system 150 takes a disk-only snapshot of the virtual machine including the operating system 312, generating an operating system base image 412. In FIG. 4C, the cloud deployment system 150 deploys the operating system base image 412 to each of the additional servers 320-1 to 320-M using a daisy chain copying technique, as previously discussed, creating operating system base images 422-1, 422-2, . . . , 422-M on corresponding additional servers 320-1, 320-2, . . . , 320-M, respectively. In FIG. 4D, the cloud deployment system 150 deploys the application 314 on the original server 310-1. In FIG. 4E, the cloud deployment system 150 takes a disk-only snapshot of the application 314, generating an application image 414. In FIG. 4F, the cloud deployment system 150 deploys the application image 414 to each of the additional servers 320-1 to 320-M using a daisy chain copying technique, as previously discussed, creating application images 424-1, 424-2, . . . , 424-M on corresponding additional servers 320-1, 320-2, . . . , 320-M, respectively.

Figure 4G:
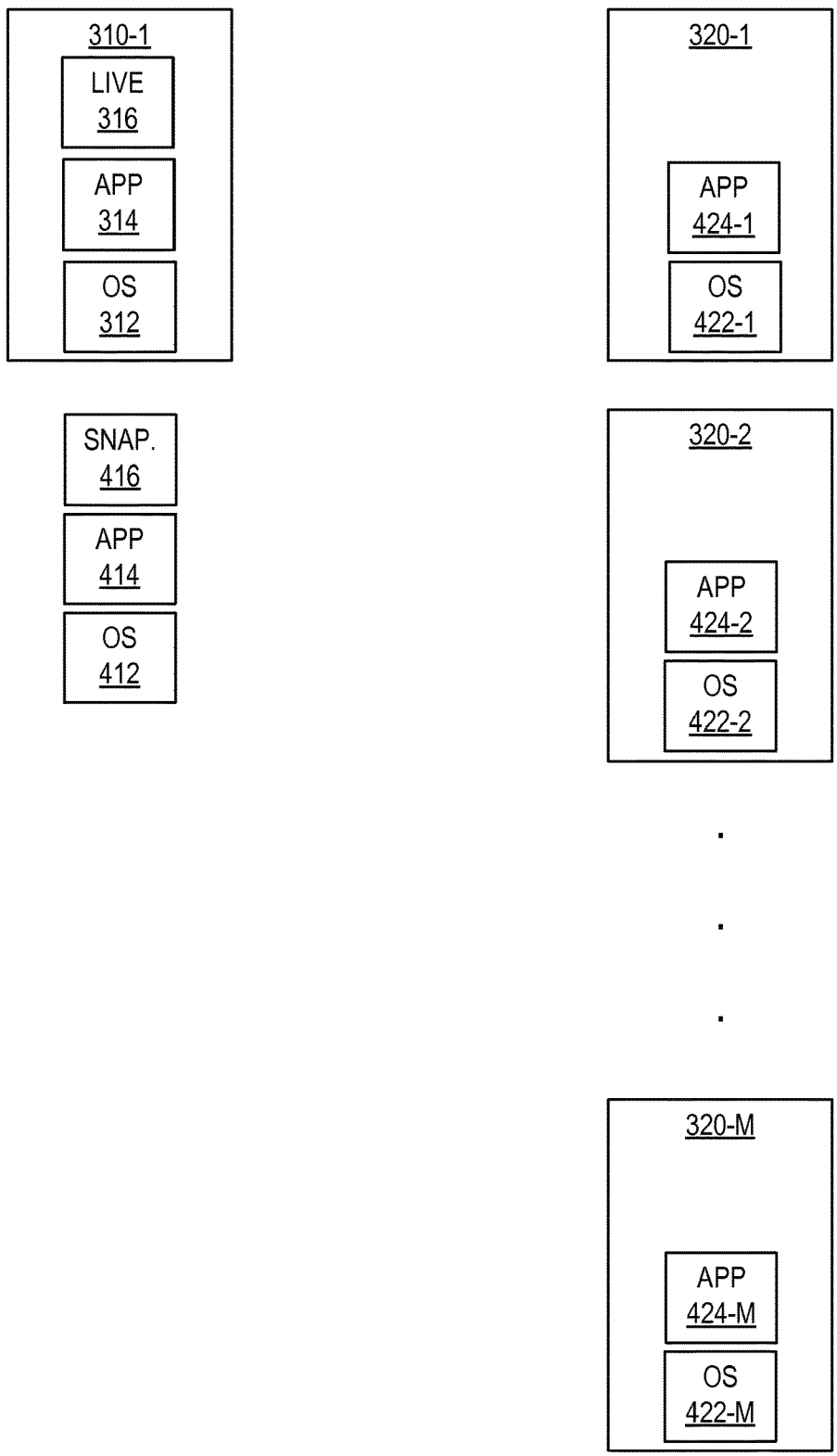

In FIG. 4G, the cloud deployment system 150 activates and runs a live instance 316 of the application 314 on the original server 310-1. The cloud deployment system 150 eventually receives a request or command to increase the capacity of the online service. Based on this request or command, the cloud deployment system 150 generates a memory snapshot 416 of the original server 310-1. In some example embodiments, the cloud deployment system 150 performs the previously-discussed optimization techniques on the original server 310-1 before generating the memory snapshot 416 of the original server 310-1.

Figure 4H:
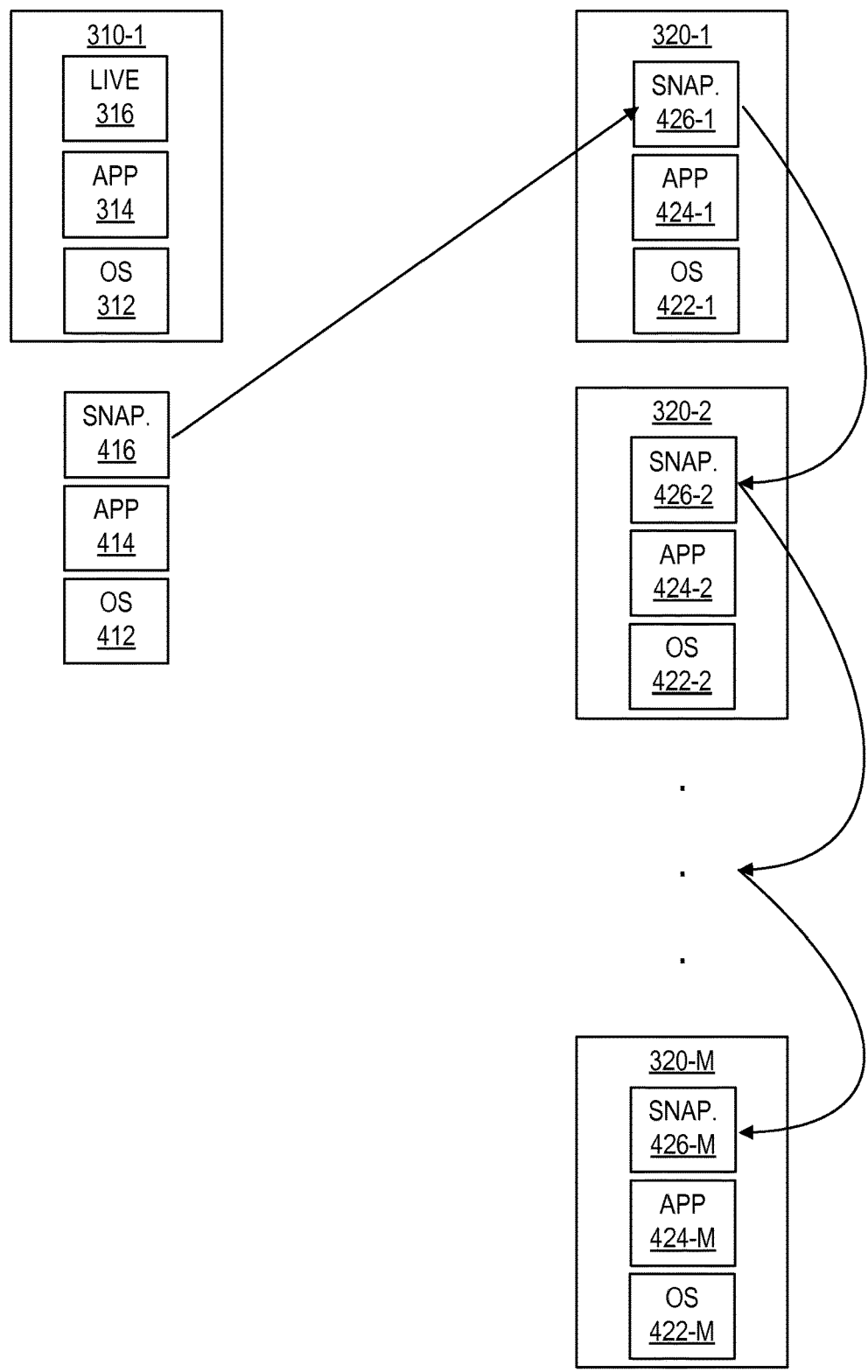

In FIG. 4H, the cloud deployment system 150 deploys the memory snapshot 416 to each of the additional servers 320-1 to 320-M using a daisy chain copying technique, as previously discussed, creating memory snapshots 426-1, 426-2, . . . , 426-M on corresponding additional servers 320-1, 320-2, . . . , 320-M, respectively. The cloud deployment system 150 then runs the additional servers 320-1 to 320-M concurrently with original servers 310-1 (and any other original servers 310), implementing the online service with the requested increase in capacity.

Figure 5:
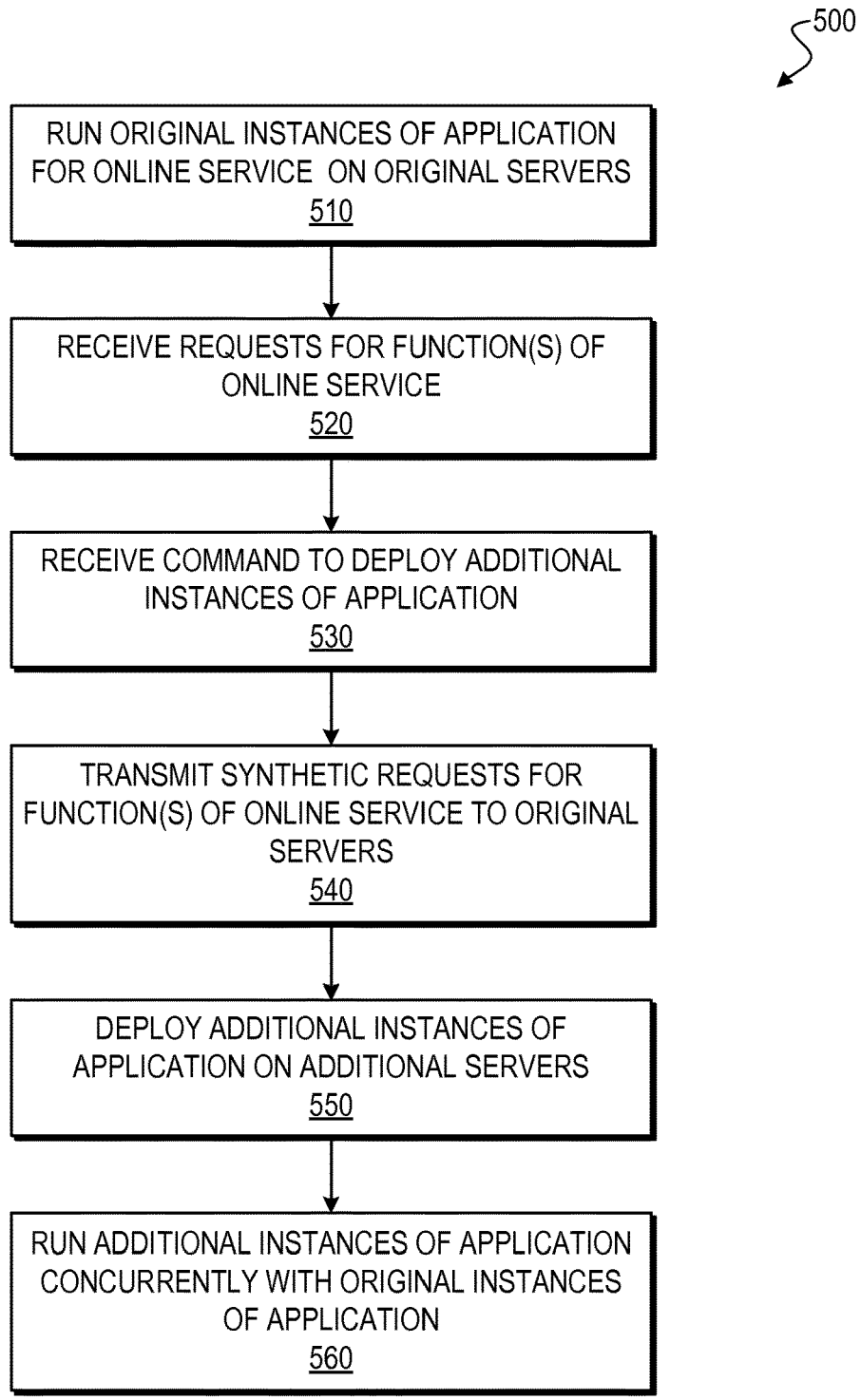
FIG. 5 is a flowchart illustrating a method of optimizing cloud deployment, in accordance with some example embodiments.

FIG. 5 is a flowchart illustrating a method 500 of optimizing cloud deployment, in accordance with some example embodiments. The operations of method 500 can be performed by a system or modules of a system. The operations of method 500 can be performed by processing logic that can comprise hardware (e.g., circuitry, dedicated logic, programmable logic, microcode, etc.), software (e.g., instructions run on a processing device), or a combination thereof. In one example embodiment, the method 500 is performed by cloud deployment system 150 of FIGS. 1 and 3, as described above. In some example embodiments, the cloud deployment system 150 causes the operations of method 500 to be performed by other components (e.g., additional servers 320) by issuing commands to the other components.

At operation 510, each of a plurality of original instances of an application is run concurrently on a corresponding one of original servers 310, with the corresponding original instances of the application on the original servers 310 implementing an online service. At operation 520, the corresponding original instances of the application on the original servers 310 receive original requests for one or more functions of the online service. At operation 530, the cloud deployment system 150 receives, subsequent to the corresponding original instances of the application receiving the original requests, a command to deploy a number of additional instances of the application. At operation 540, the cloud deployment system 150 transmits synthetic requests for the one or more functions of the online service to one of the original servers 310 according to a predetermined optimization criteria, as previously discussed, in order to optimize the original server 310. At operation 550, the cloud deployment system 150 deploys, based on the command, each of the number of additional instances of the application on a corresponding additional server 320 using a copy of the corresponding original instance of the application of the one of the original servers 310 subsequent to the transmitting the synthetic requests (or some other optimization technique) at operation 540. At operation 560, the cloud deployment system 150 runs each of the deployed additional instances of the application on their corresponding additional servers 320 concurrently with the original instances of the application being run on their corresponding original servers 310, thereby increasing the capacity of the online service.

It is contemplated that the operations of method 500 can incorporate any of the other features disclosed herein.

It is contemplated that any features of any embodiments disclosed herein can be combined with any other features of any other embodiments disclosed herein. Accordingly, these any such hybrid embodiments are within the scope of the present disclosure.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The systems, modules, methods, applications and so forth described in conjunction with FIGS. 1-5 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the features of the present disclosure in different contexts from the disclosure contained herein.

Figure 6:
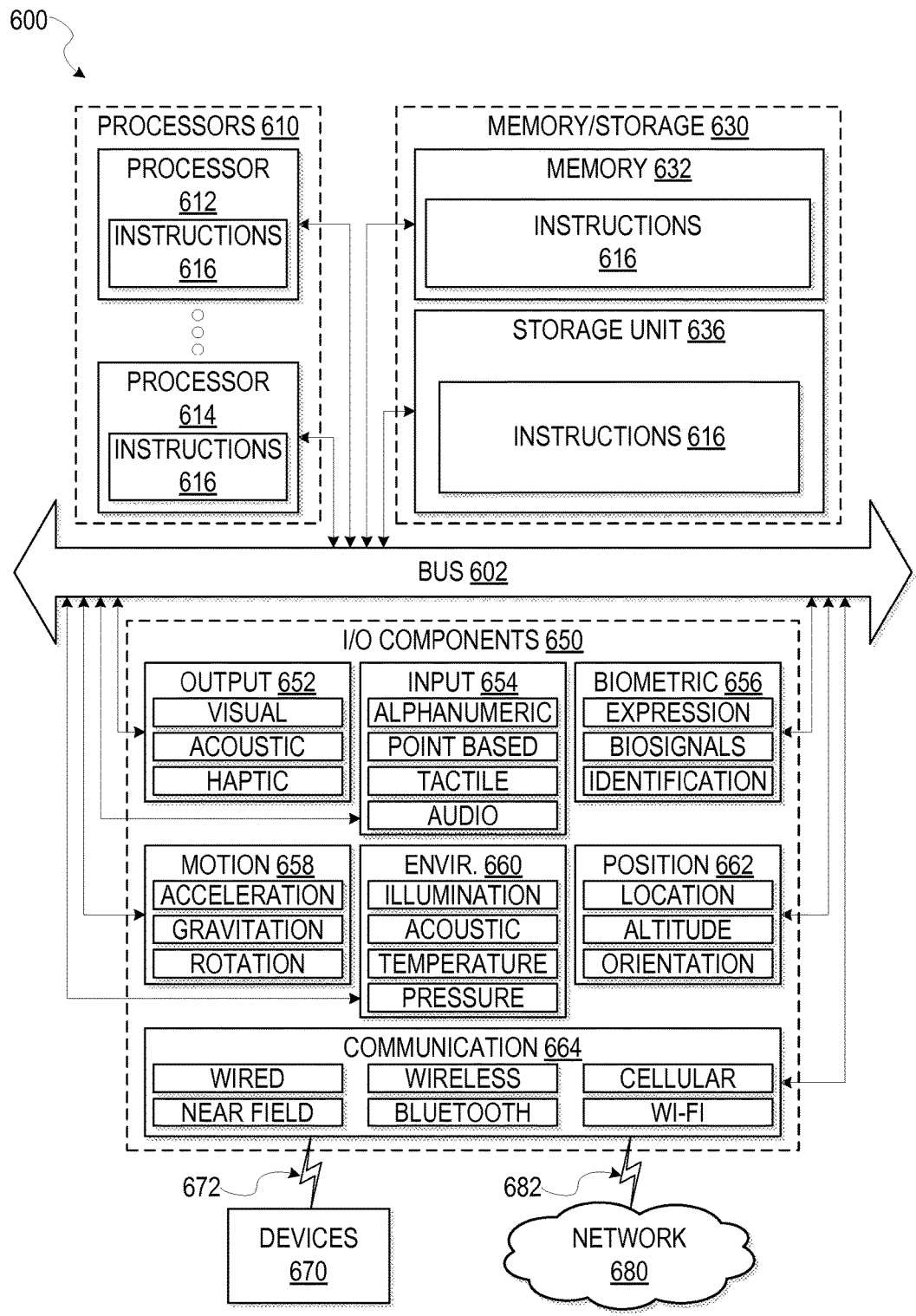
FIG. 6 is a diagrammatic representation of a machine in the form of a computer system within which a set of instructions may be executed for causing the machine to perform any one or more of the methodologies discussed herein, according to an example embodiment.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example the instructions may cause the machine to execute the flow diagram of FIG. 5. Additionally, or alternatively, the instructions may implement the cloud deployment system of FIG. 3, and so forth. The instructions transform the general, non-programmed machine into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 612 and processor 614 that may execute instructions 616. The term "processor" is intended to include multi-core processor that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core process), multiple processors with a single core, multiple processors with multiples cores, or any combination thereof.

The memory/storage 630 may include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of processors 610 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662 among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via coupling 682 and coupling 672 respectively. For example, the communication components 664 may include a network interface component or other suitable device to interface with the network 680. In further examples, communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as, location via Internet Protocol (IP) geo-location, location via Wi-Fi® signal triangulation, location via detecting a NFC beacon signal that may indicate a particular location, and so forth.

In various example embodiments, one or more portions of the network 680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or other type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to devices 670. The term "transmission medium" shall be taken to include any intangible medium that is capable of storing, encoding, or carrying instructions 616 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   at least one processor; and
   a non-transitory computer-readable medium storing executable instructions that, when executed, cause the at least one processor to perform operations comprising:
      running each of a plurality of original instances of an application concurrently on a corresponding one of a plurality of original servers, the corresponding original instances of the application on the plurality of original servers implementing an online service;
      transmitting synthetic requests for one or more functions of the online service to one of the plurality of original servers, the synthetic requests comprising requests that are received via an internal administrative entity and not received via natural client traffic;
      optimizing the corresponding original instance of the application on the one of the plurality of original servers using the transmitted synthetic requests until a predetermined optimization criteria is satisfied;
      in response to the predetermined optimization criteria being satisfied, deploying each of a number of additional instances of the application on a corresponding additional server using a copy of the optimized corresponding original instance of the application of the one of the plurality of original servers subsequent to the transmitting the synthetic requests; and
      running each of the deployed additional instances of the optimized application on their corresponding additional servers to serve natural client traffic.

2. The system of claim 1, wherein each of the plurality of original servers comprises a corresponding virtual machine, each corresponding virtual machine having a corresponding operating system on which the corresponding original instance of the application on the corresponding original server runs, and the deploying further comprises:
   copying a first image of the corresponding operating system of the one of the plurality of original servers to each one of the additional servers;
   copying a second image of the corresponding instance of the application of the one of the plurality of original servers to each one of the additional servers;
   copying a memory snapshot of the corresponding virtual machine of the one of the plurality of original servers to each one of the additional servers; and
   copying a delta disk of the corresponding virtual machine of the one of the plurality of original servers to each one of the additional servers.

3. The system of claim 2, wherein the copying of the first image, the copying of the second image, the copying of the memory snapshot, and the copying of the delta disk are performed using a daisy chain technique of repeatedly copying from one of the plurality of additional servers to another one of the additional servers until the first image, the second image, the memory snapshot, and the delta disk have been copied to all of the additional servers.

4. The system of claim 1, wherein the predetermined optimization criteria comprises transmitting synthetic requests for the one or more functions of the online service to one of the plurality of original servers until a predetermined optimization criteria is satisfied, the predetermined optimization criteria comprises at least one of a predetermined number of synthetic requests has been transmitted, synthetic requests have been transmitted for a predetermined threshold period of time, and a predetermined performance metric threshold of the one of the plurality of servers has been satisfied.

5. The system of claim 1, wherein the operations further comprise performing at least one optimization operation on the one of the plurality of original servers, the at least one optimization operation comprising at least one of running a garbage collection operation, flushing a memory of the corresponding virtual machine of the one of the plurality of original servers, and zeroing out memory bits of the corresponding operating system of the one of the plurality of original servers.

6. The system of claim 1, wherein the command to deploy the number of additional instances of the application is generated based on a corresponding request submitted by a user on a computing device.

7. The system of claim 1, wherein the command to deploy the number of additional instances of the application is generated based on a detection of an overload condition, the overload condition comprising at least one of a traffic level of the online service satisfying one or more predetermined traffic level criteria, a network connection speed of the online service satisfying one or more predetermined network connection speed criteria, and a server speed of the online service satisfying one or more predetermined server speed criteria.

8. The system of claim 1, wherein the running of each of the deployed additional instances of the application comprises receiving, by each of the deployed additional instances of the application, additional requests for the one or more functions of the online service.

9. The system of claim 1, wherein the running each of the plurality of original instances of the application concurrently on the corresponding one of the plurality of original servers comprises running each of the plurality of original instances of the application concurrently on a corresponding Java Virtual Machine on the corresponding original server.

10. The system of claim 1, wherein the online service comprises an online marketplace.

11. A computer-implemented method comprising:
running each of a plurality of original instances of an application concurrently on a corresponding one of a plurality of original servers, the corresponding original instances of the application on the plurality of original servers implementing an online service;
transmitting, by a machine having a memory and at least one processor, synthetic requests for one or more functions of the online service to one of the plurality of original servers, the synthetic requests comprising requests that are received via an internal administrative entity and not received via natural client traffic;
optimizing the corresponding original instance of the application on the one of the plurality of original servers using the transmitted synthetic requests until a predetermined optimization criteria is satisfied;
in response to the predetermined optimization criteria being satisfied, deploying each of a number of additional instances of the application on a corresponding additional server using a copy of the optimized corresponding original instance of the application of the one of the plurality of original servers subsequent to the transmitting the synthetic requests; and
running each of the deployed additional instances of the optimized application on their corresponding additional servers to service natural client traffic.

12. The computer-implemented method of claim 11, wherein each of the plurality of original servers comprises a corresponding virtual machine, each corresponding virtual machine having a corresponding operating system on which the corresponding original instance of the application on the corresponding original server runs, and the deploying further comprises:
copying a first image of the corresponding operating system of the one of the plurality of original servers to each one of the additional servers;
copying a second image of the corresponding instance of the application of the one of the plurality of original servers to each one of the additional servers;
copying a memory snapshot of the corresponding virtual machine of the one of the plurality of original servers to each one of the additional servers; and
copying a delta disk of the corresponding virtual machine of the one of the plurality of original servers to each one of the additional servers.

13. The computer-implemented method of claim 12, wherein the copying of the first image, the copying of the second image, the copying of the memory snapshot, and the copying of the delta disk are performed using a daisy chain technique of repeatedly copying from one of the plurality of additional servers to another one of the additional servers until the first image, the second image, the memory snapshot, and the delta disk have been copied to all of the additional servers.

14. The computer-implemented method of claim 11, wherein the predetermined optimization criteria comprises transmitting synthetic requests for the one or more functions of the online service to one of the plurality of original servers until a predetermined optimization criteria is satisfied, the predetermined optimization criteria comprises at least one of a predetermined number of synthetic requests has been transmitted, synthetic requests have been transmitted for a predetermined threshold period of time, and a predetermined performance metric threshold of the one of the plurality of servers has been satisfied.

15. The computer-implemented method of claim 11, further comprising performing at least one optimization operation on the one of the plurality of original servers, the at least one optimization operation comprising at least one of running a garbage collection operation, flushing a memory of the corresponding virtual machine of the one of the plurality of original servers, and zeroing out memory bits of the corresponding operating system of the one of the plurality of original servers.

16. The computer-implemented method of claim 11, wherein the command to deploy the number of additional instances of the application is generated based on a corresponding request submitted by a user on a computing device.

17. The computer-implemented method of claim 11, wherein the command to deploy the number of additional instances of the application is generated based on a detection of an overload condition, the overload condition comprising at least one of a traffic level of the online service satisfying one or more predetermined traffic level criteria, a network connection speed of the online service satisfying one or more predetermined network connection speed criteria, and a server speed of the online service satisfying one or more predetermined server speed criteria.

18. The computer-implemented method of claim 11, wherein the running of each of the deployed additional instances of the application comprises receiving, by each of the deployed additional instances of the application, additional requests for the one or more functions of the online service.

19. The computer-implemented method of claim 11, wherein the running each of the plurality of original instances of the application concurrently on the corresponding one of the plurality of original servers comprises running each of the plurality of original instances of the application concurrently on a corresponding Java Virtual Machine on the corresponding original server.

20. A non-transitory machine-readable storage medium storing a set of instructions that, when executed by at least one processor, causes the at least one processor to perform operations comprising:

running each of a plurality of original instances of an application concurrently on a corresponding one of a plurality of original servers, the corresponding original instances of the application on the plurality of original servers implementing an online service;

transmitting synthetic requests for one or more functions of the online service to one of the plurality of original servers, the synthetic requests comprising requests that are received via an internal administrative entity and not received via natural client traffic;

optimizing the corresponding original instance of the application on the one of the plurality of original servers using the transmitted synthetic requests until a predetermined optimization criteria is satisfied;

in response to the predetermined optimization criteria being satisfied, deploying each of a number of additional instances of the application on a corresponding additional server using a copy of the optimized corresponding original instance of the application of the one of the plurality of original servers subsequent to the transmitting the synthetic requests; and running each of the deployed additional instances of the optimized application on their corresponding additional servers to service natural client traffic.

* * * * *